United States Patent [19]
Somers

[11] Patent Number: 6,153,702
[45] Date of Patent: *Nov. 28, 2000

[54] POLYMERS, AND NOVEL COMPOSITIONS AND FILMS THEREFROM

[75] Inventor: Marc Stacey Somers, Longview, Tex.

[73] Assignee: Eastman Chemical Company, Kingsport, Tenn.

[*] Notice: This patent is subject to a terminal disclaimer.

[21] Appl. No.: 09/145,684

[22] Filed: Sep. 2, 1998

Related U.S. Application Data

[60] Provisional application No. 60/058,769, Sep. 12, 1997.

[51] Int. Cl.$^7$ ..................................................... C08L 23/04
[52] U.S. Cl. .......................... 525/236; 525/240; 526/351; 526/352; 526/348
[58] Field of Search .................................... 526/348, 352, 526/351; 525/240, 236

[56] References Cited

U.S. PATENT DOCUMENTS

| | | |
|---|---|---|
| 3,700,753 | 10/1972 | Terada et al. .................... 260/876 B |
| 4,123,417 | 10/1978 | Finberg et al. . |
| 4,275,119 | 6/1981 | Weiner . |
| 4,291,092 | 9/1981 | Weiner . |
| 4,339,496 | 7/1982 | Weiner . |
| 4,339,498 | 7/1982 | Weiner . |
| 4,340,640 | 7/1982 | Weiner . |
| 4,340,641 | 7/1982 | Weiner . |
| 4,348,455 | 9/1982 | Clayton . |
| 4,367,256 | 1/1983 | Biel . |
| 4,399,180 | 8/1983 | Briggs et al. . |
| 4,418,114 | 11/1983 | Briggs et al. . |
| 4,430,457 | 2/1984 | Dobreski . |
| 4,536,549 | 8/1985 | Hattori et al. . |
| 4,542,188 | 9/1985 | van der Heijden . |
| 4,588,650 | 5/1986 | Mientus et al. . |
| 4,597,920 | 7/1986 | Golike . |
| 4,624,991 | 11/1986 | Haas . |
| 4,692,496 | 9/1987 | Bahl et al. . |
| 4,822,855 | 4/1989 | Kobayashi et al. . |
| 4,851,478 | 7/1989 | Su . |
| 4,861,834 | 8/1989 | Audureau et al. . |
| 4,871,813 | 10/1989 | Senez . |
| 4,929,681 | 5/1990 | Bahl et al. . |
| 4,985,498 | 1/1991 | Shirodkar . |
| 5,041,491 | 8/1991 | Turke et al. . |
| 5,047,468 | 9/1991 | Lee et al. . |
| 5,051,481 | 9/1991 | Taka et al. . |
| 5,085,927 | 2/1992 | Dohrer . |
| 5,087,667 | 2/1992 | Hwo . |
| 5,110,870 | 5/1992 | Fujii et al. . |
| 5,114,763 | 5/1992 | Brant et al. . |
| 5,126,398 | 6/1992 | Lee et al. . |
| 5,126,408 | 6/1992 | Rifi . |
| 5,147,936 | 9/1992 | Peszkin et al. . |
| 5,212,246 | 5/1993 | Ogale . |
| 5,218,046 | 6/1993 | Audureau et al. . |
| 5,254,617 | 10/1993 | Isoue et al. . |
| 5,262,228 | 11/1993 | Kobyama et al. . |
| 5,328,734 | 7/1994 | Morese-Seguela et al. . |
| 5,334,428 | 8/1994 | Dobreski et al. . |
| 5,344,714 | 9/1994 | Su . |
| 5,358,792 | 10/1994 | Mehta . |
| 5,374,677 | 12/1994 | Nishio et al. . |
| 5,378,764 | 1/1995 | Benham et al. . |
| 5,397,843 | 3/1995 | Lakshmanan et al. . |
| 5,407,732 | 4/1995 | Dokurno . |
| 5,455,303 | 10/1995 | Panagopoulos, Jr. et al. ........... 525/95 |
| 5,464,905 | 11/1995 | Tsutsui et al. . |
| 5,478,890 | 12/1995 | Shinozaki et al. . |
| 5,489,478 | 2/1996 | Audry et al. . |
| 5,561,195 | 10/1996 | Govoni et al. . |
| 5,569,693 | 10/1996 | Doshi et al. . |
| 5,631,069 | 5/1997 | Wooster . |
| 5,635,262 | 6/1997 | Best . |
| 5,637,665 | 6/1997 | Sustic et al. . |
| 5,654,051 | 8/1997 | Andersson et al. . |
| 5,656,374 | 8/1997 | Marzola et al. . |

FOREIGN PATENT DOCUMENTS

| | | |
|---|---|---|
| 1 296 484 | 2/1992 | Canada . |
| 0 251 771 | 1/1988 | European Pat. Off. . |
| 41 30 299 | 3/1993 | Germany . |
| WO 96 35741 | 11/1996 | WIPO . |

OTHER PUBLICATIONS

*Research Disclosure*, Jun. 1992, 33875, Amorphous Polyolefins as Tack Additives for Polyethylene Blown and Cast Film.

Primary Examiner—David W. Wu
Assistant Examiner—Ling-Siu Choi
Attorney, Agent, or Firm—Jonathan D. Wood; Harry J. Gwinnell

[57] ABSTRACT

A novel propylene copolymer is disclosed. Also disclosed is a novel composition comprising about 85 to about 99 weight percent of a polymeric ethylenic containing component having a density no greater than 0.94 g/cc, and about 1 to about 15 weight percent of a novel propylene copolymer comprising from about 60 to about 80 weight percent propylene, based on the copolymer, and from about 20 to about 40 weight percent olefin comonomer units, the propylene copolymer having a viscosity of about 1 to about 2,000 mPa•s at 190° C. and a needle penetration of greater than about 150 to about 300 dmm. Also disclosed are films produced from the composition, both blown and cast, and both monolayer and multilayer. Also disclosed are processes for stretch wrapping and forming blown film.

12 Claims, No Drawings

POLYMERS, AND NOVEL COMPOSITIONS AND FILMS THEREFROM

CROSS REFERENCE TO RELATED APPLICATIONS

This application claims priority under 35 U.S.C. Section 119(e) to United States Provisional Application Ser. No. 60/058,769, filed Sep. 12, 1997. The present application is related to co-pending U.S. application Ser. Nos. 09/104,726, 09/104,726, 09/145,452, and 09/145,451.

FIELD OF THE INVENTION

The present invention relates to novel polymers and use thereof in compositions having particular utility in the production of film. More particularly, the present invention relates to novel propylene copolymers and compositions comprising a blend of an ethylene polymer and the novel propylene polymers having particular utility in the production of film, especially stretch wrap cling film.

BACKGROUND OF THE INVENTION

Blown stretch wrap film generally has higher tensile strength than cast film. Linear low density polyethylene ("LLDPE") is much more useful than low density polyethylene ("LDPE") as the film-forming component of blown stretch wrap films. However, a cling additive must be blended with LLDPE since LLDPE film does not exhibit a high level of cling when stretched in the typical usage to about 200 percent elongation. The film made from the composition of the present invention generally also has an unwinding noise not greater than the unwinding noise of the neat ethylenic polymer. This is important in light of the OSHA noise workplace restrictions.

June 1992 U.S. Research Disclosure 33875 discloses that a polyolefin having a Brookfield Thermosel Viscosity of about 6,000 mPa•s at 190° C., and a needle penetration hardness of about 35 dmm and a polyolefin having a Brookfield Thermosel viscosity of 2300 mPa•s at 190° C. and a needle penetration hardness of 20 dmm are useful in cast and blown LLDPE and LDPE film. The applicant has found that blown polyethylene based stretch cling films containing these polyolefins have little or no peel cling strength at 200 percent elongation. The applicant has previously disclosed a very low viscosity partially crystalline propylene-ethylene cling additive for EVA, LDPE, and LLDPE stretch film composition. The disclosed propylene-ethylene cling additive comprises a partially crystalline propylene-ethylene copolymer having 10 to 40 weight percent ethylene units, within the viscosity range of 1 to 2,000 mPa•s at 190° C. The known propylene-ethylene copolymer cling additive has a needle penetration hardness less than about 150 dmm at 23° C. The film composition disclosed therein is more useful for film blowing than are film compositions made with the above higher viscosity polyolefins. However, the previously disclosed blown film has a peel cling strength that is lower than cast films containing the above higher viscosity polyolefin cling additives.

In light of the above, it would be desirable to have a polyethylene-based film having the combination of excellent blown film properties as well as relatively high peel cling strength.

SUMMARY OF THE INVENTION

The present invention relates to novel propylene copolymers described hereinafter and to a composition of matter which comprises about 85 to about 99 weight percent based on the composition of an ethylenic component selected from the group consisting of low density polyethylene, linear low density polyethylene, ethylene vinyl acetate copolymer and mixtures thereof; and about 1 to about 15 weight percent based on the composition of a novel propylene copolymer comprising from about 60 to about 80 weight percent propylene, based on the copolymer, and from about 20 to about 40 weight percent olefin comonomer units having 2 to 10 carbon atoms, based on the copolymer, wherein said propylene copolymer has a Brookfield Thermosel viscosity of about 1 to about 2,000 mPa•s at 190° C. and a needle penetration of greater than about 150 to about 300 dmm, determined according to ASTM at 23° C. Novel films are produced from the novel compositions.

DETAILED DESCRIPTION OF THE INVENTION

The applicant has unexpectedly found that, within the viscosity range of about 1 to about 2,000 mPa•s at 190° C., a propylene-ethylene copolymer, having a needle penetration hardness of greater than from about 150 to about 300 dmm, is useful in stretch cling film compositions based on LDPE, LLDPE, or EVA. The composition of the present invention provides a blown stretch cling film having a good balance between maximizing peel cling strength and acceptably low high-speed unwinding noise.

It was surprising to find that the stretch cling film composition of the present invention provides a film having excellent peel cling when stretched to about 200 percent elongation, yet also having good blown film properties such as lower haze, higher gloss, and improved puncture penetration.

The composition of the present invention comprises from about 85 to about 99 weight percent based on the composition, of an ethylenic component selected from the group of ethylene polymers consisting of low density polyethylene ("LDPE"), linear low density polyethylene ("LLDPE"), ethylene vinyl acetate ("EVA"), and mixtures thereof, and about 1 to about 15 weight percent based on the composition, of a propylene copolymer comprising from about 60 to about 80 weight percent propylene, based on the copolymer, and from about 20 to about 40 weight percent based on the copolymers, of olefin comonomer units having 2 to 10 carbon atoms. The propylene copolymer has a Brookfield Thermosel viscosity of about 1 to about 2,000 mPa•s at 190° C., and a needle penetration of greater than about 150 to about 300 dmm, at 23° C.

The ethylene containing polymeric component is a homopolymer of ethylene or a copolymer of ethylene with a comonomer copolymerizable therewith. More particularly, the ethylene containing polymeric component is selected from a homopolymer of ethylene, an ethylene alpha olefin copolymer, an ethylene vinyl acetate copolymer, and mixtures thereof, wherein the ethylene containing polymeric component has a density no greater than 0.94 g/cc. The ethylene containing polymeric component preferably has a density of from about 0.88 to about 0.93 g/cc, and more preferably from about 0.89 to about 0.92 g/cc.

The alpha olefin comonomer of the ethylene alpha olefin copolymer preferably has from 3 to 20 carbon atoms per molecule and is present in an amount of from about 2 to about 20 weight percent based on the ethylene alpha olefin copolymer. Examples of the alpha olefin comonomer include 1-butene, 1-pentene, 4-methyl-1-pentene, 1-hexene, 1-octene, 1-nonene, 1-decene, 1-dodecene, a terpolymer of ethylene, a terpolymer of 1-butene, a terpolymer of 1-hexene, and mixtures and derivatives thereof. In a preferred embodiment, the alpha olefin is selected from 1-butene, 1-hexene and 1-octene.

The ethylene containing polymeric component may be prepared readily by any conventional technique known in the art.

Stretch wrap film made from blown film processes is generally stronger than film made from casting. Since LDPE and EVA are not as strong as LLDPE films, the preferred ethylenic component of the present invention is LLDPE. LLDPE has excellent machine direction (MD) elongation, good tear resistance, good tensile strength, and good puncture resistance. LLDPE is a copolymer of ethylene and an alpha olefin, with density of from about 0.88 to about 0.94 g/cm$^3$ and a melt index of about 0.4 to 8 g/10 min. The LLDPE used is more preferably an ethylene-octene or ethylene-hexene LLDPE copolymer. The presence of up to about 20 weight percent LDPE, along with the LLDPE, improves processability, bubble stability, and optical properties.

The ethylenic containing polymeric component comprises from about 85 to about 99 weight percent of the present composition and the propylene copolymer comprises from about 1 to about 15 weight percent of the composition. More preferably, the composition comprises about 90 to about 99 weight percent ethylenic polymer, and from about 1 to about 10 weight percent propylene polymer, based on the composition.

The novel propylene copolymers, of the present invention are very low molecular weight copolymers, comprising from about 60 to about 80 percent by weight propylene, based on the copolymer, and from about 20 to about 40 weight percent based on the copolymer, of C2 to C10 alpha olefin comonomer unit content. The propylene copolymer preferably has about 20 to about 35 weight percent olefin comonomer unit content and from about 65 to about 80 weight percent propylene. Copolymers comprising from about 70 to about 80 weight percent propylene and about 20 to about 30 weight percent olefin comonomer units are more preferred. The alpha olefin comonomer units are preferably ethylene units.

The molecular weight of the propylene copolymer of the present invention is critical. The low molecular weight is evidenced by the viscosity values at 190° C., determined by the Brookfield Thermosel melt viscosity method. This very low viscosity range of the propylene copolymer is from about 1 to about 2,000 mPa•s, at 190° C. The viscosity is preferably from about 1 to about 1,500 mPa•s at 190° C., with about 1 to about 800 mPa•s at 190° C. being more preferred.

The propylene copolymer of the present invention has a needle penetration of greater than about 150 to about 300 dmm, determined by ASTM (test method modified to 23° C., instead of 25° C.). The propylene copolymer preferably has a needle penetration of about 175 to about 300 dmm at 23° C., with about 200 to about 300 dmm at 23° C. being more preferable.

The propylene copolymer component of the composition utilized herein may be produced by a process disclosed in Canadian Patent 1,296,484, entitled "Process for the Direct Synthesis of Highly Amorphous Propylene Homopolymers and Propylene—Ethylene Copolymers." The contents of Canadian Patent 1,296,484 are incorporated herein by reference.

The exact amounts of the ethylene containing polymeric component and the propylene polymer component of the compositions herein are determined by the application for which film produced therefrom is to be employed. Variation of the amounts of each component is within the scope of one skilled in the art.

For many purposes, it may be desirable to incorporate other conventional additives with the compositions of the present invention. For example, there may be added antioxidants, heat and light stabilizers, dyes, antistatic agents, preservatives, processing aids, pigments, flame retardants, and the like.

The compositions of the ethylene containing polymeric component defined hereinabove and the propylene polymer defined hereinabove are readily prepared by any method known in the art. For example, the components of the composition may be blended together by melt extrusion or may be admixed together on a conventional mixing machine such as an extruder or a continuous mixer.

The composition of the present invention has a good peel cling strength for use in forming stretch wrap film. It is now commonplace for stretch wrap film to be elongated to 200 percent and higher, during a stretch wrapping process. Peel cling strength generally decreases with more elongation. Therefore, it is important to determine that the peel cling strength of a film be adequate when elongated, instead of being measured only when unstretched, as has been past practice. At 200 percent elongation, film produced from the composition of the present invention preferably has a peel cling strength of about 100 to about 500 g/2.54 cm, preferably about 100 to about 400 g/2.54 cm, with about 100 to about 300 g/2.54 cm being still more preferable, determined using ASTM Method D5458-95 "Standard Test Method for Peel Cling of Stretch Wrap Film".

The composition of the present invention can be formed into stretch wrap film using any technique known in the art such as a cast method or blown film method. The present invention includes a blown film process wherein an extruder having an annular die is used for extruding the composition of the present invention. Air is blown in through the extruder die to form a bubble of the present polymer blend having a blow-up ratio of 1 to 3.5 times the die diameter. After a cooling air stream cures the film, the film is wound onto rolls. More particularly, a composition as defined hereinabove is introduced into the feed hopper of an extruder that is water-cooled and resistance heated. The films were produced using an annular die having a die gap of about 2.24 mm having a dual orifice nonrotating, nonadjustable air ring. The film is extruded through the die into a film that is cooled by blowing air onto the surface of the film in a blowing manner. The film is drawn from the die typically forming a cylindrical film that is cooled, collapsed, optionally slit, and wound to form a roll of film. In preparing cast film, any of the well known cast film forming procedures may be utilized.

The present invention further includes a film of the composition of the present invention. The preferable film is a blown stretch wrap cling film. The film generally has a higher impact strength and a higher gloss than the neat LLDPE. The film made from the composition of the present invention generally also has a high speed unwinding noise not greater than the unwinding noise of neat LLDPE. This is important in light of the OSHA noise workplace restrictions. The present invention also includes articles of manufacture comprising a film of the composition of the present invention. Such articles include monolayer films and multilayer films in which the film of the composition of the present invention is at least one layer.

The present invention further includes a process for stretch wrapping, using a film of the composition of the present invention. The process comprises wrapping the film of the present invention about the girth of a unitized plurality of goods so that the film is in a stretched condition and the end region of the film is attached to a previous area of film by cling force.

The invention will be more readily understood by reference to the following examples. There are, of course, many other forms of the invention which will become obvious to one skilled in the art, once the invention has been fully disclosed, and it will accordingly be recognized that these examples are given for the purpose of illustration only, and are not to be construed as limiting the scope of this invention in any way.

EXAMPLES

The following test procedures were used in evaluating the analytical properties of the compositions herein and in evaluating the physical properties of the films of the examples.

Cling values were obtained in accordance with ASTM D5458-95 entitled "Standard Test Method for Peel Cling of Stretch Wrap Film."

Viscosity—ASTM D3236 (at 190° C.)
Needle Penetration—ASTM (at 23° C.)
Melt index—ASTM D1238 (at 190° C.)
Density—ASTM D4888

Example 1

The present example illustrates the usefulness of a propylene-ethylene copolymer of the present invention in producing an LLDPE film as compared to a film produced from LLDPE and a propylene-ethylene copolymer having a needle penetration not within the present invention. The needle penetration data for the propylene-ethylene copolymers shown in Table 1 was determined by ASTM at 23° C.

The propylene-ethylene copolymers in Table 1 were compounded into a 0.9 g/10 min. melt index, 0.920 g/cm$^3$ density ethylene-hexene copolymer at a level of 4% by weight and made into 0.0008 inch (0.020 mm) thick blown film. The films were made with a blow-up ratio of about 2.4:1 at about 100 feet/minute (30.5 m/minute).

Peel cling properties were measured in accordance with ASTM Method D5458-95 "Standard Test Method for Peel Cling of Stretch Wrap Film". Peel cling values were measured on both unstretched film and at about 200% elongation. The elongated peel cling values more accurately represent the conditions encountered during pallet wrapping, where the film is stretched by pre-stretch rollers or by the pallet load itself. Peel cling values listed in Table 2 were measured 2 weeks after the film was produced.

TABLE 1

Properties of Propylene-Ethylene Copolymers

| Propylene Copolymer | Visc., mPa · s at 190° C. | Wt. % Ethylene | Needle Pen. dmm |
| --- | --- | --- | --- |
| A (Comparison) | 235 | 15.9 | 109 |
| B | 275 | 25.7 | 263 |
| C | 158 | 21.46 | 242 |

TABLE 2

Peel Cling of Blown LLDPE Films Containing 4% Propylene-Ethylene Copolymer

| Propylene Copolymer in Film | Unelongated Peel Cling, g/2.54 cm | Elongated Peel Cling, g/2.54 cm |
| --- | --- | --- |
| None | 0 | 0 |
| A (Comparison) | 296 | 186 |
| B | 321 | 187 |
| C | 298 | 214 |

The data in Table 2 indicates that blown films produced from LLDPE and propylene-ethylene copolymers of the present invention (Sample B and C) showed equal or higher peel cling than a comparative film produced from LLDPE and a propylene-ethylene copolymer (Sample A) not within the present invention, which is commercially utilized in such films.

It should be clearly understood that the forms of the invention herein described are illustrative only and are not intended to limit the scope of the invention. The present invention includes all modifications falling within the scope of the following claims.

What is claimed is:

1. A composition comprising:
   (a) from about 85 to about 99 weight percent, based on the total weight of the composition, of a component selected from the group consisting of a homopolymer of ethylene, an ethylene alpha olefin copolymer, an ethylene vinyl acetate copolymer, and mixtures thereof, wherein the component has a density no greater than 0.94 g/cc; and
   (b) from about 1 to about 15 weight percent, based on the total weight of the composition, of a propylene copolymer comprising about 20 to about 40 weight percent based on the copolymer of olefin comonomer units having 2 to 10 carbon atoms and from about 60 to about 80 weight percent propylene, based on the copolymer, wherein the propylene copolymer has a Brookfield Thermosel viscosity of about 200 mPa•s at 190° C. and a needle penetration of greater than about 150 to about 300 dmm, determined according to ASTM at 23° C.

2. The composition according to claim 1 wherein the component has a density of from about 0.88 to about 0.93 g/cc.

3. The composition according to claim 1 wherein the component is an ethylene alpha olefin copolymer wherein the alpha olefin comonomer has from 3 to 20 carbon atoms and is present in an amount of from about 2 to about 20 weight percent based on the ethylene alpha olefin copolymer.

4. The composition according to claim 3 wherein the alpha olefin comonomer is selcted from 1-butene, 1-hexene and 1-octene.

5. The composition according to claim 1 wherein the olefin comonomer units of the propylene copolymer are ethylene units.

6. The composition according to claim 1 wherein the propylene copolymer comprises from about 20 to about 35 weight percent olefin comonomer units, and from about 65 to about 80 weight percent propylene.

7. The composition according to claim 6 wherein the propylene copolymer comprises from about 20 to about 30 weight percent olefin comonomer units, and from about 70 to about 80 weight percent propylene.

8. The composition according to claim 1 wherein the propylene copolymer has a Brookfield Thermosel viscosity of from about 1 to about 1500 mPa•s at 190° C.

9. The composition according to claim 8 wherein the propylene copolymer has a Brookfield Thermosel viscosity of from about 1 to about 800 mPa•s at 190° C.

10. The composition according to claim 1 wherein the propylene copolymer has a needle penetration of about 175 to about 300 dmm at 23° C.

11. The composition according to claim 10 wherein the propylene copolymer has a needle penetration of about 200 to about 300 dmm at 23° C.

12. The composition according to claim 1 wherein the component is present in an amount of about 90 to about 99 weight percent and the propylene copolymer is present in an amount of about 1 to about 10 weight percent.

* * * * *

UNITED STATES PATENT AND TRADEMARK OFFICE
CERTIFICATE OF CORRECTION

PATENT NO. : 6,153,702
DATED : November 28, 2000
INVENTOR(S) : Marc Stacey Somers It is certified that error appears in the above-identified patent and that said Letters Patent is hereby corrected as shown below:

Column 6,
Line 42, (Claim 1, line 16), after "about", [200] should be deleted and --- 1 to about 2,000 --- should be inserted.

Signed and Sealed this

Twenty-third Day of October, 2001

Attest:

NICHOLAS P. GODICI
Attesting Officer
Acting Director of the United States Patent and Trademark Office